US009620950B1

(12) United States Patent
Auvenshine et al.

(10) Patent No.: US 9,620,950 B1
(45) Date of Patent: *Apr. 11, 2017

(54) OVERLOAD DETECTION FOR ELECTRICAL WIRING

(71) Applicant: International Business Machines Corporation, Armonk, NY (US)

(72) Inventors: John J. Auvenshine, Tucson, AZ (US); Henry C. Will, IV, Dover, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/253,472

(22) Filed: Aug. 31, 2016

Related U.S. Application Data

(63) Continuation of application No. 15/140,401, filed on Apr. 27, 2016, now Pat. No. 9,483,929.

(51) Int. Cl.
| | |
|---|---|
| G08B 21/00 | (2006.01) |
| H02H 3/08 | (2006.01) |
| H02H 3/10 | (2006.01) |
| H02H 3/24 | (2006.01) |
| G08B 21/18 | (2006.01) |
| H04L 29/08 | (2006.01) |
| H04W 4/00 | (2009.01) |

(52) U.S. Cl.
CPC .......... *H02H 3/085* (2013.01); *G08B 21/185* (2013.01); *H02H 3/105* (2013.01); *H02H 3/24* (2013.01); *H04L 67/10* (2013.01); *H04W 4/008* (2013.01)

(58) Field of Classification Search
CPC ........... H02H 3/085; H02H 3/20; G08B 21/18

USPC ............................. 340/657, 660, 664; 361/1
See application file for complete search history.

(56) References Cited

U.S. PATENT DOCUMENTS

| | | | | |
|---|---|---|---|---|
| 5,541,803 A | * | 7/1996 | Pope, Jr. ................ | H01B 7/324 219/494 |
| 5,642,248 A | * | 6/1997 | Campolo ........... | H01R 13/7135 361/115 |
| 5,946,180 A | * | 8/1999 | Simpson ............ | H01R 13/7039 307/126 |
| 6,005,484 A | * | 12/1999 | Ko ....................... | G01K 11/12 116/207 |
| 2002/0056501 A1 | | 5/2002 | Bingel, III et al. | |

(Continued)

FOREIGN PATENT DOCUMENTS

| | | |
|---|---|---|
| CN | 205139662 U | 4/2016 |
| DE | 29924885 U1 | 7/2006 |

(Continued)

*Primary Examiner* — Phung Nguyen
(74) *Attorney, Agent, or Firm* — Sherman IP LLP; Kenneth L. Sherman; Steven Laut

(57) ABSTRACT

A method includes sensing by multiple overload detection sensors connected to a power cord, a type of overload detection. The type of overload detection includes: thermal detection, voltage drop detection, and current reading detection. The method further includes powering the overload detection sensors from a same power supply as the electrical power cord by direct wiring or inductive coupling. An overload detection is triggered by one or more actionable events including: a ground fault circuit interrupter (GFCI) trip, a visual signal, an audible alarm, radio frequency identification (RFID) communication signaling, a wired or wireless communication.

1 Claim, 3 Drawing Sheets

(56) References Cited

U.S. PATENT DOCUMENTS

| | | | |
|---|---|---|---|
| 2007/0257764 A1* | 11/2007 | D'Agostino | H01R 13/7137 337/36 |
| 2015/0311694 A1 | 10/2015 | Cojocaru | |
| 2016/0099560 A1 | 4/2016 | Yamada et al. | |

FOREIGN PATENT DOCUMENTS

| | | |
|---|---|---|
| DE | 102008003786 A1 | 7/2009 |
| JP | 201250302 A | 3/2012 |

* cited by examiner

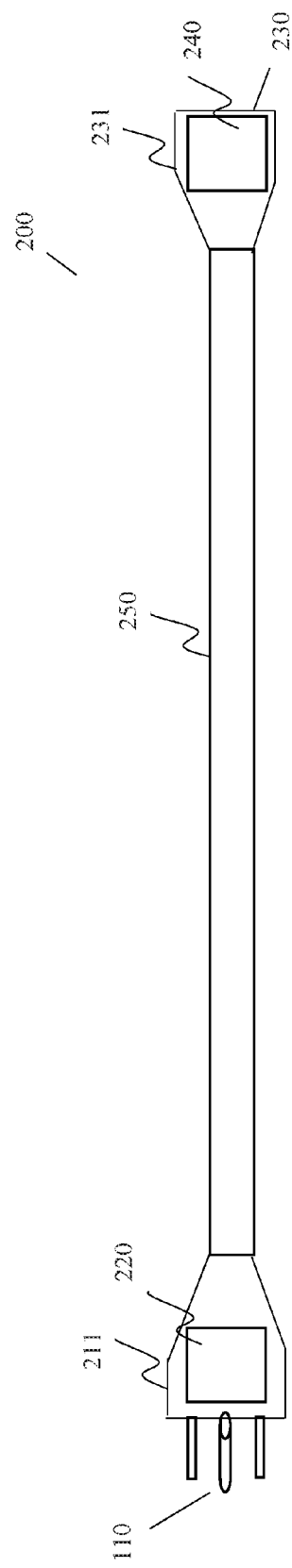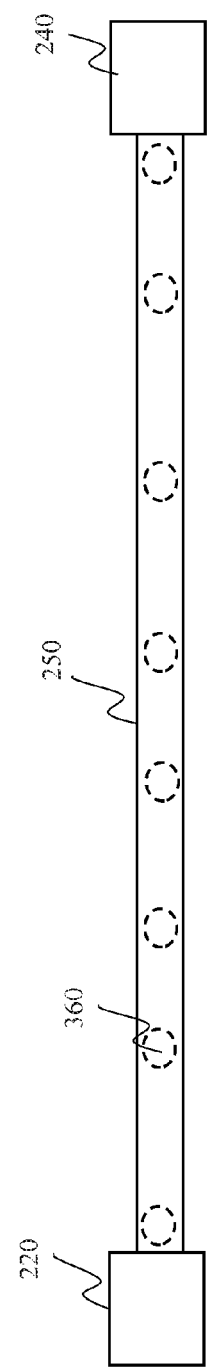

OVERLOAD DETECTION FOR ELECTRICAL WIRING

BACKGROUND

Electrical wiring can be overloaded and catch fire. Many times this occurs without warning. The common widespread solution to this problem are circuit breakers and fuses, some of which may be driven or supplemented by thermal detection. This has the problem that within an electrical system or device behind the breaker/fuse, there may be multiple smaller wires which cannot carry enough current to trip the breaker before becoming overloaded.

SUMMARY

Embodiments relate to overload detection for electrical wires. One embodiment includes a method comprising: sensing, by multiple overload detection sensors coupled to a power cord, a type of overload detection. The type of overload detection comprises one or more of: thermal detection, voltage drop detection, and current reading detection. The overload detection sensors are powered from a same power supply as the power cord by direct wiring or inductive coupling. For a thermal detection type of overload detection, the method includes sensing by the multiple overload detection sensors within insulation of the power cord. The multiple overload detection sensors comprise thermal sensors configured to detect an overload upon sensing a temperature in excess of a thermal rating for the insulation of the power cord. For a voltage drop detection type of overload detection, the method provides sensing by the multiple overload detection sensors across power supply lines. The multiple overload detection sensors comprise voltage drop sensors that perform: communicating signals on the power supply lines, via separate wires, or wirelessly for measuring and comparing voltage readings; determining a maximum predetermined voltage drop based on a rated supply voltage and current handling capabilities of the power cord; and detecting an overload upon a voltage drop occurring in excess of the maximum predetermined voltage drop. For a current reading detection type of overload detection, the method provides sensing by the multiple overload detection sensors across power supply lines or in individual sockets in the power cord. The multiple overload detection sensors comprise current reading sensors that perform detecting an overload based on current reading exceeding a predetermined current threshold. The method further provides triggering an overload detection by one or more actionable events powered by the power cord, the actionable events comprising: a ground fault circuit interrupter (GFCI) trip, a visual signal, an audible alarm, radio frequency identification (RFID) communication signaling, a wired or wireless communication.

These and other features, aspects and advantages of the present invention will become understood with reference to the following description, appended claims and accompanying figures.

BRIEF DESCRIPTION OF THE DRAWINGS

FIG. 2 shows a representative electrical cord, according to an embodiment;

FIG. 3 shows a representative electrical cord, according to another embodiment.

DETAILED DESCRIPTION

Figure 1:
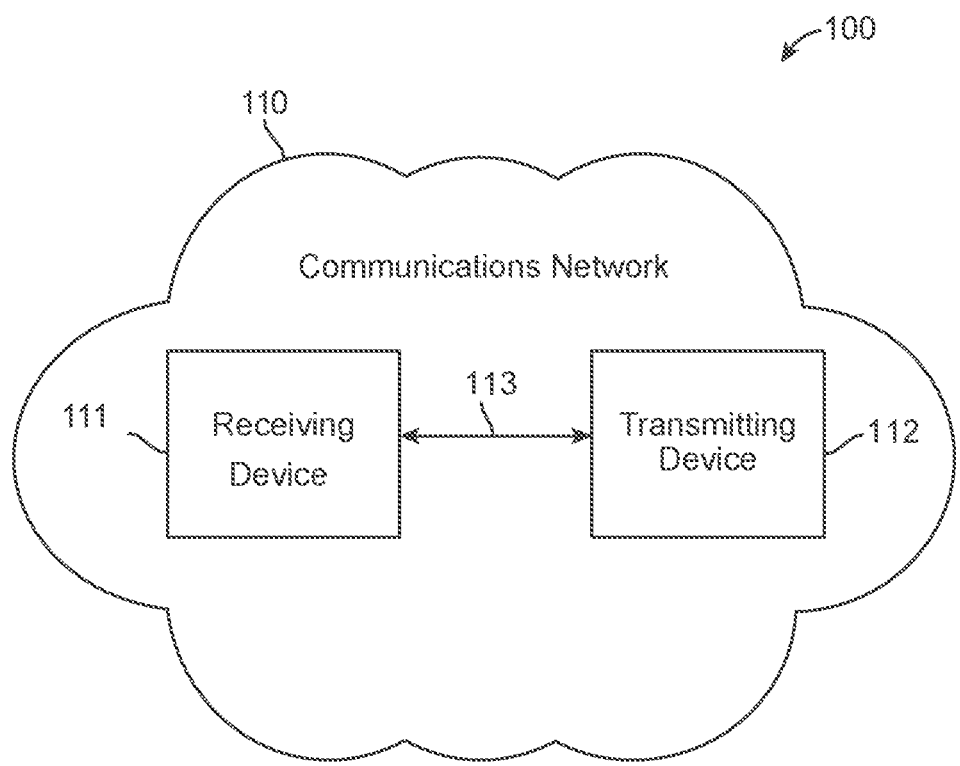
FIG. 1 shows a schematic view of a communications system, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

One or more embodiments relate to overload detection for electrical wires. One embodiment includes a power cord and multiple overload detection sensors coupled to the power cord based on a type of overload detection. The type of overload detection comprises one or more of: thermal detection, voltage drop detection, and current reading detection. The overload detection sensors are powered from a same power supply as the electrical power cord by direct wiring or inductive coupling. For a thermal detection type of overload detection, the multiple overload detection sensors are placed within insulation of the power cord at one or more of: a first end, a second end, and along length of the power cord. The multiple overload detection sensors comprise thermal sensors configured to detect an overload upon sensing a temperature in excess of a thermal rating for the insulation of the power cord. For a voltage drop detection type of overload detection, the multiple overload detection sensors are placed across power supply lines. The multiple overload detection sensors comprise voltage drop sensors configured to: communicate by signals on the power supply lines, via separate wires or wirelessly to measure and compare voltage readings; determine a maximum predetermined voltage drop based on a rated supply voltage and current handling capabilities of the power cord; and detect an overload upon a detection that a voltage drop occurs in excess of the maximum predetermined voltage drop. For a current reading detection type of overload detection, the multiple overload detection sensors are placed across power supply lines or in individual sockets in the power cord. The multiple overload detection sensors comprise current reading sensors configured to detect an overload based on current reading exceeding a predetermined current threshold. An overload detection triggers one or more actionable events powered by the power cord, the actionable events comprising circuitry for one or more of: a ground fault circuit interrupter (GFCI) trip, a visual signal, an audible alarm, radio frequency identification (RFID) communication signaling, a wired or wireless communication.

Consider an extension cord capable of carrying 10 amps, which is plugged into a house power circuit with a 20 amp circuit breaker. A heater drawing 15 amps, with an internal overload protection breaker is then plugged into the extension cord. This type of appliance connection and usage is common. The result is that the extension cord is overloaded, and may become dangerously hot and cause a fire. The power circuit's breaker will not trip because there are no more than 20 amps being drawn. Similarly, the heater's overload protection breaker will not trip because no more than 15 amps is being drawn. The problem is that a cord with too low of a duty rating has been used, but with conventional power cords there is no way to prevent this or detect when it occurs. Currently, extension cords carry warning labels regarding maximum current draws (sometimes expressed in wattage assuming a standard 115 VAC power source). However, most users do not read these warnings, or do not understand how much power their devices are using and whether that exceeds the rating of the cords they are using.

FIG. 1 is a schematic view of a communications system 100 that may be implemented, in accordance with one embodiment. Communications system 100 may include a communications device that initiates an outgoing communications operation (transmitting device 112) and a communications network 110, which transmitting device 112 may use to initiate and conduct communications operations with other communications devices within communications network 110. For example, communications system 100 may include a communication device (receiving device 111) that receives the communications operation from the transmitting device 112. Although communications system 100 may include multiple transmitting devices 112 and receiving devices 111, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, WiFi (e.g., an IEEE 802.11 protocol), BLUETOOTH®, high frequency systems (e.g., 900 MHz, 2.4 GHz, and 5.6 GHz communication systems), infrared, cellular, other relatively localized wireless communication protocol, or any combination thereof. In one example, a long range communications protocol can include Wi-Fi. The transmitting device 112 and receiving device 111, when located within communications network 110, may communicate over a bidirectional communication path such as path 113, or over two unidirectional communication paths. Both the transmitting device 112 and receiving device 111 may be capable of initiating a communications operation and receiving an initiated communications operation.

The transmitting device 112 and receiving device 111 may include any suitable device for sending and receiving communications operations. For example, the transmitting device 112 and receiving device 111 may be included in intelligent electrical cords, mobile telephone devices, television systems, cameras, camcorders, a device with audio video capabilities, tablets, wearable devices, other smart devices, and any other device capable of communicating wirelessly (with or without the aid of a wireless-enabling accessory system) or via wired pathways (e.g., electrical wiring, traditional telephone wires, etc.). The communications operations may include any suitable form of communications, including for example, signaling, sound, visual light, data communications (e.g., e-mails, text messages, media messages, notifications), or combinations of these.

FIG. 2 shows a representative intelligent electrical wire (or cord) 200, according to an embodiment. In one embodiment, the intelligent electrical wire 200 may include a plug portion 110 (e.g., three-prong for three wire, two-prong for two wire, etc.), a plug portion housing 211, a receptacle section 230 (e.g., two-prong, three-prong, etc.), a receptacle portion housing 231, an intelligent electrical wire processing circuitry 220 and 240, and electrical wire insulation 250. In one example, consider the intelligent electrical wire 200 as a two or three wire extension cord. In this example, sensors measure voltage across supply lines at beginning of the cord (source) in the intelligent electrical wire processing circuitry 220, and end (destination) in the intelligent electrical wire processing circuitry 240, calculate voltage drop with known resistance in the wiring informs how much current is flowing. If the voltage drop exceeds a predetermined amount, one or more of the following is performed:

Shunt a small amount of current to ground (e.g., 10 mA) in a three-wire cord, in order to trip a GFCI (Ground Fault Circuit Interrupter) of any amperage rating (in either the intelligent electrical wire processing circuitry 220 or 240);

Light or flash a visual light (e.g., a light emitting diode (LED), chips on board (COB), etc.) at the source (in the intelligent electrical wire processing circuitry 220) and/or destination end (in the intelligent electrical wire processing circuitry 240) of the cord;

Sound an audible alarm (in either the intelligent electrical wire processing circuitry 220 or 240);

Respond to radio frequency identification (RFID) interrogation (in the intelligent electrical wire processing circuitry 220 or 240) that an overload condition exists; and Send a wired or wireless signal (from the intelligent electrical wire processing circuitry 220 or 240) to a central monitor that an overload condition exists.

FIG. 3 shows a representative view of a portion of the intelligent electrical wire 200, according to another embodiment. This portion of the intelligent electrical wire 200 is shown with use heat/thermal sensors 360 within the electrical wire insulation 250, at the source end, at the destination end, or throughout the electrical wire length to detect an overload condition.

In other embodiments, the intelligent electrical wire 200 may include other means of directly measuring current flow (such as are found in ammeters). In one example, the intelligent electrical wire 200 may be implemented in a datacenter within a rack between Power Distribution Units (PDUs) and rack components, or within servers behind one or more common power supplies.

One or more embodiments provide the intelligent electrical wire 200 that is capable, on its own, of detecting an overload on its specific wire composition and acting upon that condition, regardless of what circuit protection features may be present in the power source or the load that may exceed the intelligent electrical wire 200 capability (e.g., as an extension cord or power cord). Additionally, one or more embodiments may deliberately trigger a non-integrated GFCI based on a condition of current overload rather than the existence of a ground fault.

Referring back to FIG. 2, in one embodiment the following may be included in the construction of the intelligent electrical wire 200, which may be added to standard extension or power cord construction techniques. In one example, a determination is made as to the overload detection method (s) per the implementation; either thermal, voltage drop, current (e.g., ammeter) or any combination thereof. Detection sensors are powered by the same power supply as the cord, by drawing a small amount of current as necessary from the wiring/cord for the intelligent electrical wire 200 itself either by direct wiring or by inductive coupling.

In one embodiment, for a voltage detection implementation a direct current (DC) circuit or hot/neutral or hot/hot in an alternating current (AC) circuit is placed at the beginning and end of the cord (in the intelligent electrical wire processing circuitry 220 and 240). In one example, these two voltage sensors 360 (FIG. 4) may communicate by signals on the power line of the intelligent electrical wire 200, or do so wirelessly (e.g., using WiFi, BLUETOOTH®, etc.) so that the voltages measured may be compared. The maximum allowable voltage drop may be determined based on the rated supply voltage and current handling capabilities of the extension or power cord implementing the intelligent electrical wire 200. In one example, as the extension or power cord using the intelligent electrical wire 200 is energized, if a voltage drop in excess of the allowable drop is detected, an overload is considered detected.

In one embodiment, for current detection one or more current sensors 360 are placed in the supply lines or individual sockets (in the case of multiple sockets) in the intelligent electrical wire 200 cord. Detection of the current using the current sensors is used to detect an overload condition. The action(s) when an overload is detected may be selected for implementation (e.g., wire or wireless data communication/signaling, audio signals, or visual signals); as with detection, actions are powered by the implemented extension or power cord supply (using the intelligent electrical wire 200) as necessary.

In one embodiment, for a GFCI trip, approximately 10 ma of current is shunted from hot to ground. In one or more embodiments, for visual light or flash, or an audible alarm, the intelligent electrical wire 200 connects visual light sources or an audio alarm circuit across the power supply in the intelligent electrical wire processing circuitry 220. For RFID interrogation, when an RF interrogation signal is received in any of the intelligent electrical wire processing circuitry 220 or 240 (e.g., via communications 430, FIG. 4), processing 460 (FIG. 4) responds with a code indicating overload condition exists that is transmitted to an RFID receiver in a network.

Referring again to FIG. 3, for thermal detection thermal sensors 360 are placed within the electrical wire insulation 250 at the beginning, end, or along the length of the intelligent electrical wire 200. If any sensor 360 detects a temperature in excess of the thermal rating for the insulation of the intelligent electrical wire 200, an overload is detected.

In one or more embodiments, for wired signal to central monitoring, digital communication may be implemented over power lines to send a signal(s) that an overload condition exists. For a wireless signal sent to central monitoring, BLUETOOTH®, WiFi, cellular, or other wireless communication protocols may be used to send the signal(s) indicating that an overload condition exists. In one embodiment, the intelligent electrical wire 200 may also report when an overload has not yet occurred, but is near (e.g., within 95% of an overload condition) or is predicted (e.g., by determining a trend, such as a steadily rising current). In other embodiments, the intelligent electrical wire 200 may also monitor past thermal, voltage drop, or current values and provide reporting communications.

Figure 4:
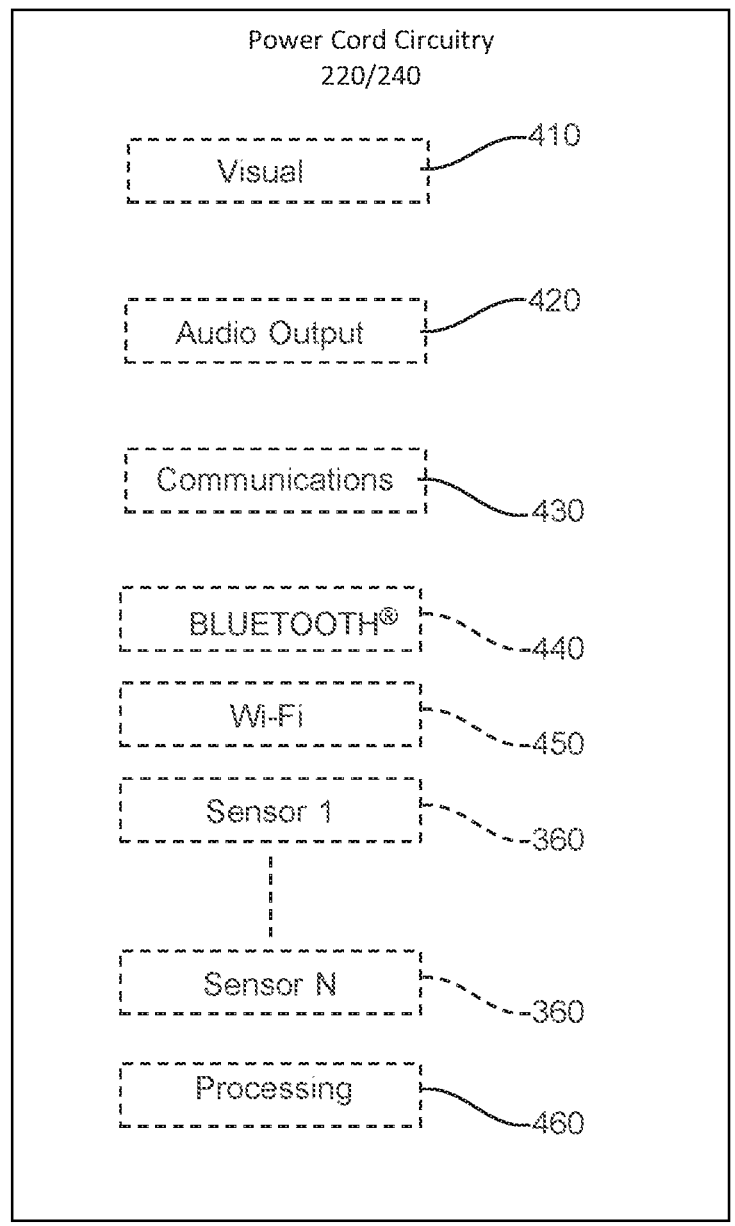
FIG. 4 illustrates a block diagram for architecture for different options for processing, sensing and communication for an electrical cord of FIG. 2 or FIG. 3, according to one or more embodiments.

FIG. 4 illustrates a block diagram for architecture for different options for processing, sensing and communication for the intelligent electrical wire 200 cord of FIG. 2 or FIG. 3, according to one or more embodiments. Both the transmitting device 112 and receiving device 111 may be implemented in the intelligent electrical wire processing circuitry 220/240 to include some or all of the features including: visual 410, an audio output 420, communications 430 circuitry, a BLUETOOTH® interface 440, a Wi-Fi interface 450, sensors 1 to N 360 (N being a positive integer), intelligent electrical wire processing 460 and any other suitable components.

In one embodiment, the visual 410 circuitry may include any type of lighting element (e.g., COB, LED, etc.) for providing a visual indication of, for example, an overload condition, an "OK" operating condition, a warning of a potential overload condition, etc. In one embodiment, the audio output 420 circuitry may include any suitable audio component for providing an audio indication or alarm to the user of an intelligent electrical wire 200. For example, audio output 420 may include one or more speakers, transducers, etc. built into the intelligent electrical wire 200 or transmitted over a network. In some embodiments, the audio output 420 may include an audio component that is remotely coupled to the intelligent electrical wire 200. For example, the audio output 420 may be coupled to communications device with a wire or wirelessly (e.g., BLUETOOTH® headphones, headset or speaker).

In one embodiment, communications 430 circuitry may be any suitable communications 430 circuitry operative to connect to a communications network (e.g., communications network 110, FIG. 1) and to transmit communications operations from the intelligent electrical wire processing circuitry 220/240 to other devices within the communications network. Communications 430 circuitry may be operative to interface with the communications network using any suitable communications protocol such as, for example, WiFi (e.g., an IEEE 802.11 protocol), BLUETOOTH®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications 430 circuitry may be operative to create a communications network using any suitable communications protocol. For example, communications 430 circuitry may create a short-range communications network using a short-range communications protocol to connect to other communications devices. For example, communications 430 circuitry may be operative to create a local communications network using the BLUETOOTH® protocol to couple the intelligent electrical wire processing circuitry 220/240 with a BLUETOOTH® capable monitoring device.

In one embodiment, the BLUETOOTH® interface 440 comprises processes and/or programs for processing BLUETOOTH® information, and may include a receiver, transmitter, transceiver, etc.

In one embodiment, the WiFi interface 450 comprises processes and/or programs for processing WiFi information, and may include a receiver, transmitter, transceiver, etc.

In one embodiment, the intelligent electrical wire processing circuitry 220/240 may include multiple sensors 1 to N 360, such as RFID, current, voltage, thermal/heat, etc. In one embodiment, the multiple sensors 1-N 360 provide information to the processing 460, which may include voltage, current, thermal, GFCI trip, actions, etc. for overload, near overload, etc. processing. In one embodiment, the multiple sensors 1-N 360 may be aggregated or used from different connected intelligent electrical wire 200 cords (e.g., connected power cords, connected extension cords, etc.). For example, thermal sensor(s) may be used from one extension cord, and a current sensor(s) may be used from another extension cord.

In one embodiment, control circuitry of the intelligent electrical wire processing circuitry 220/240 may be operative to control the operations and performance of the intelligent electrical wire processing circuitry 220/240. Control circuitry may include, for example, one or more processors, a bus (e.g., for sending information/instruction to the other components of the intelligent electrical wire processing circuitry 220/240), memory, storage, or any other suitable component for controlling the operations of the intelligent electrical wire processing circuitry 220/240. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the intelligent electrical wire processing circuitry 220/240 performs communications operations.

In one embodiment, the intelligent electrical wire processing circuitry 220/240 may include any other component suitable for performing a communications operation. For example, the intelligent electrical wire processing circuitry 220/240 may include an integrated power supply, ports, or interfaces for coupling to a host device, an input mechanism (e.g., an ON/OFF switch), or any other suitable component.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

sensing, by multiple overload detection sensors coupled to a power cord, a type of overload detection, wherein the type of overload detection comprises one or more of: thermal detection, voltage drop detection, and current reading detection, powering the overload detection sensors from a same power supply as the power cord by direct wiring or inductive coupling;

for a thermal detection type of overload detection, sensing by the multiple overload detection sensors within insulation of the power cord, wherein the multiple overload detection sensors comprise thermal sensors configured to detect an overload upon sensing a temperature in excess of a thermal rating for the insulation of the power cord;

for a voltage drop detection type of overload detection, sensing by the multiple overload detection sensors across power supply lines, wherein the multiple overload detection sensors comprise voltage drop sensors that perform:

communicating signals on the power supply lines, via separate wires, or wirelessly for measuring and comparing voltage readings;

determining a maximum predetermined voltage drop based on a rated supply voltage and current handling capabilities of the power cord; and detecting an overload upon a voltage drop occurring in excess of the maximum predetermined voltage drop; and for a current reading detection type of overload detection, sensing by the multiple overload detection sensors across power supply lines or in individual sockets in the power cord, wherein the multiple overload detection sensors comprise current reading sensors that perform detecting an overload based on current reading exceeding a predetermined current threshold; and triggering overload detection by one or more actionable events powered by the power cord, the actionable events comprising: a ground fault circuit interrupter (GFCI) trip, a visual signal, an audible alarm, radio frequency identification (RFID) communication signaling, a wired or wireless communication.

* * * * *